United States Patent [19]
Muraoka

[11] Patent Number: 6,002,950
[45] Date of Patent: Dec. 14, 1999

[54] SATELLITE COMMUNICATION APPARATUS

[75] Inventor: Shinya Muraoka, Tokyo, Japan

[73] Assignee: NEC Corporation, Tokyo, Japan

[21] Appl. No.: 08/958,678

[22] Filed: Oct. 27, 1997

[30] Foreign Application Priority Data

Nov. 1, 1996 [JP] Japan ..................................... 8-291867

[51] Int. Cl.$^6$ ...................................................... H04Q 7/20
[52] U.S. Cl. ......................... 455/570; 455/550; 455/12.1; 370/286
[58] Field of Search .................................... 455/550, 570, 455/575, 12.1; 379/410, 411, 388, 406, 409; 370/286, 287, 288, 289, 290, 291

[56] References Cited

U.S. PATENT DOCUMENTS

| | | | |
|---|---|---|---|
| 5,018,134 | 5/1991 | Kokubo et al. | 370/289 |
| 5,416,829 | 5/1995 | Umemoto | 455/570 X |
| 5,696,819 | 12/1997 | Suizu et al. | 379/390 |
| 5,835,851 | 11/1998 | Rasmusson | 455/570 |

FOREIGN PATENT DOCUMENTS 6-13940  1/1994  Japan .

*Primary Examiner*—Wellington Chin
*Assistant Examiner*—Yemane Woldetatios
*Attorney, Agent, or Firm*—Young & Thompson

[57] ABSTRACT

A satellite communication apparatus is capable of accurately determining whether there is a received audio signal or not without being affected by ambient conditions, for thereby preventing the characteristics of an adaptive filter from being degraded. A demodulator demodulates a signal received by an antenna, generating synchronizing frame data and a synchronizing frame signal. At this time, the demodulator also generates a synchronization status signal indicating whether the synchronizing frame signal is being generated at a constant period or not. An echo canceler determines whether there is an audio signal or not on based on the synchronization status signal which has been generated by the demodulator and delayed for a given period of time by a delay circuit. Based on the determined result, the echo canceler estimates tap coefficients for generating a quasi-echo signal, and updates the quasi-echo signal.

4 Claims, 5 Drawing Sheets

SATELLITE COMMUNICATION APPARATUS

BACKGROUND OF THE INVENTION

1. Field of the Invention

The present invention relates to a digital satellite communication apparatus which has an audio echo canceler.

2. Description of the Related Art

As shown in FIG. 1, the conventional satellite communication apparatus has an audio echo canceler 301, an audio encoder 308 for encoding an audio signal E1, which is outputted from the audio echo canceler 301 into an encoded audio signal in a format that has been determined for an individual satellite circuit, a modulator 310 for modulating the encoded audio signal from the audio encoder 308 according to a modulation process determined for an individual satellite circuit and converting the modulated audio signal into an audio signal having a radio frequency, an antenna 313 for transmitting the audio signal from the modulator 310, and receiving an audio signal transmitted from an external source, a demodulator 311 for demodulating an audio signal received by the antenna 313 and generating and outputting synchronizing frame data R2 and a synchronizing frame signal FP based on the demodulated audio signal, an audio decoder 309 for decoding the synchronizing frame data R2 and the synchronizing frame signal FP outputted from the demodulator 311 into a digital audio signal X and outputting the digital audio signal X to the echo canceler 301, and a branching filter 312 for outputting the audio signal from the modulator 310 to the antenna 313 and outputting the audio signal from the antenna 313 to the demodulator 311.

The echo canceler 301 comprises a tap coefficient memory 305 for generating and outputting N tap coefficients HR, a received audio signal detector 307 for being supplied with the digital audio signal X from the audio decoder 309, determining whether there is a received audio signal or not, and outputting a detected result, a double-talk detector 306 for being supplied with an audio signal Y generated in a transmission circuit 2 and the digital audio signal X, and, if the audio signal Y and the digital audio signal X are simultaneously present, outputting a signal indicative of such a simultaneous presence, an adaptive filter 302 for generating and outputting a quasi-echo signal HX based on the tap coefficients HR outputted from the tap coefficient memory 305, and outputting a signal HW to estimate tap coefficients for the tap coefficient memory 305 based on the detected result from the received audio signal detector 307 and a signal outputted from the double-talk detector 306, and a subtractor 303 for being supplied with the audio signal Y generated in the circuit 2 and the quasi-echo signal HX from the adaptive filter 302, and subtracting the quasi-echo signal HX from the audio signal Y to generate the audio signal E1 to be transmitted.

As shown in FIG. 2 of the accompanying drawings, the demodulator 311 comprises a frequency converter 403 for converting the frequency of a signal received by the antenna 313 and inputted through the branching filter 312 (see FIG. 1), a demodulating circuit 402 for demodulating the frequency-converted signal from the frequency converter 403 into a digital baseband signal R1, and a frame synchronizing circuit 401 for detecting a pattern indicative of the first timing of effective data from the digital baseband signal R1 outputted from the demodulating circuit 402, and generating and outputting synchronizing frame data R2 and a synchronizing frame signal FP from the detected pattern.

Operation of the conventional satellite communication apparatus will be described below.

In a transmission mode, the conventional satellite communication apparatus operates as follows:

When an audio signal E1 to be transmitted is outputted from the echo canceler 301, the audio signal E1 is supplied to the audio encoder 308. The audio encoder 308 encodes the audio signal E1 into an encoded audio signal in a format that has been determined for the individual satellite circuit, and outputs the encoded audio signal to the modulator 310.

The modulator 310 modulates the encoded audio signal according to a modulation process determined for the individual satellite circuit and converts the modulated audio signal into an audio signal having a radio frequency.

The audio signal outputted from the modulator 310 is supplied through the branching filter 312 to the antenna 313, from which the audio signal is transmitted toward a satellite (not shown).

A present satellite terminal station, particularly a satellite terminal station that is often operated by a battery, employs a voice activation process (or VOX process) which measures the electric power of the inputted audio signal E1 with the audio encoder 308, and determines that there is an audio signal to be transmitted and transmits the audio signal to another station only when the measured electric power is in excess of a certain threshold value. The illustrated conventional satellite communication apparatus operates on such principles.

In a reception mode, the conventional satellite communication apparatus operates as follows:

When an audio signal from another station is received by the antenna 313, the received audio signal is supplied through the branching filter 312 to the demodulator 311.

In the demodulator 311, the frequency converter 403 converts the frequency of the received audio signal, and the demodulator 402 demodulates the frequency-converted audio signal into a digital baseband signal R1. Then, the frame synchronizing circuit 401 detects a pattern (hereinafter referred to as UW) inherent in the satellite circuit and indicative of the starting of the data from the digital baseband signal R1, and detects the start of the data of each frame from the pattern, thus generating synchronizing frame data R2 and a synchronizing frame signal FP (see FIG. 3 of the accompanying drawings). The synchronizing frame data R2 and the synchronizing frame signal FP are then outputted to the audio decoder 309.

The audio decoder 309 decodes the synchronizing frame data R2 and the synchronizing frame signal FP from the demodulator 311 into a digital audio signal X, which is outputted to the echo canceler 301.

According to the voice activation process, at times other than when UW is not detected due to a reception failure, the frame synchronizing circuit 401 of the demodulator 311 is not synchronized when the party at the other station is not talking, because no signal is being received from the satellite. In this case, the synchronizing frame signal FP is fixed to "0" and the synchronizing frame data R2 (actually not synchronized) is undefined in the frame synchronizing circuit 401.

Operation of the echo canceler 301 will be described below.

When the digital audio signal X is supplied from the audio decoder 309, the digital audio signal X is outputted to the circuit 2 and is also supplied to the adaptive filter 302, the double-talk detector 306, and the received audio signal detector 307.

The adaptive filter 302 calculates a quasi-echo signal HX based on the supplied digital audio signal X and the tap coefficients HR outputted from the tap coefficient memory 305 according to the following equation (1):

$$HXj = \sum_{i=1}^{N} (Hi \times X_{j-1}) \quad (i)$$

where j represents the degree on a time base and i the number of the tap coefficient.

The double-talk detector 306 determines whether only a transmitted audio signal is present or both transmitted and received signals are present, based on a certain threshold value, from the electric power ratio of the audio signal Y from the circuit 2 and the digital audio signal X. If both transmitted and received signals are present, then the double-talk detector 306 outputs a signal indicative of the stopping of the estimation of tap coefficients to the adaptive filter 302.

The received audio signal detector 307 measures the electric power of the digital audio signal X at all times. If the electric power of the digital audio signal X is smaller than a certain threshold value, then the received audio signal detector 307 determines that there is no received audio signal, and outputs a signal indicative of the stopping of the estimation of tap coefficients to the adaptive filter 302.

When the quasi-echo signal X is generated by the adaptive filter 302, the quasi-echo signal HX is supplied to the subtractor 303, which subtracts the quasi-echo signal HX from the audio signal Y from the circuit 2, and outputs the difference as an audio signal E1 to be transmitted to the circuit 1.

Simultaneously, the audio signal E1 is also supplied to the adaptive filter 302. After having generated the quasi-echo signal HX, the adaptive filter 302 estimates tap coefficients according to the following equation (2):

$$HWi = HRi + \mu \sum_{i=1}^{N} (E2j \times X_{j-1}) \quad (2)$$

where $\mu$ is a parameter for determining the rate of convergence and stability of an echo suppressing quantity.

For generating a quasi-echo signal HX, the adaptive filter 302 reads the N tap coefficients HR from the tap coefficient memory 305. Then, the adaptive filter 302 generates a quasi-echo signal HX using the N tap coefficients HR. For subsequently estimating tap coefficients HR, the adaptive filter 302 newly estimates tap coefficients HR according to the equation (2). The adaptive filter 302 sends the estimated tap coefficients HR as the signal HW to the tap coefficient memory 305 where they are stored.

Each time a digital audio signal X is applied to the adaptive filter 302, the adaptive filter 302 estimates and updates tap coefficients. The characteristics of the adaptive filter 302 are thus made closer to the characteristics of an actual echo path, so that the audio signal E1 to be transmitted is minimized to prevent an echo signal Y, due to the digital audio signal X, from being transmitted.

The conventional satellite communication apparatus may be incorporated in a circuit arrangement which, as shown in FIG. 4 of the accompanying drawings, cancels an echo, which is produced when a received audio signal regenerated by a loudspeaker 602 is picked up by a hands-free microphone 601, with a quasi-echo signal Y that is generated by an adaptive filter 604 (see Japanese laid-open patent publication No. 1994-13940).

In the satellite communication apparatus shown in FIG. 4, a received audio signal detector 608 determines whether there is a received audio signal or not, as follows:

If it is assumed that a speaker signal (transmitted or received signal) at a sampling period i is represented by a(i), then an autocorrelation function S(j) when the speaker signal a(i) is shifted j times the sampling period is given by:

$$S(j) = \Sigma a(i) x a(i+j) / \Sigma a(i) x a(i) \quad (3)$$

Two autocorrelation functions S(j) are determined for each i to range from 1 to N (a value having a period longer than the possible maximum pitch of the speaker signal a(i)).

In a transmitted audio signal detector 607 and a received audio signal detector 608, the parameter j is varied in a given range having a central value corresponding to the average pitch of the speaker signal, for thereby determining a plurality of autocorrelation functions S(j). Then, a maximum value Smax(j), for example, of the autocorrelation functions S(j) is determined. If the maximum value Smax(j) is large, then it is determined that there is a speaker signal (transmitted signal or received signal). If the maximum value Smax(j) is small, then it is determined that there is no speaker signal.

The above conventional satellite communication apparatus suffers the following problems:

(1) If the threshold value for determining whether there is a received signal present or not is not optimally established in the received audio signal detector, and it is determined that a received signal is present and tap coefficients are estimated even though no received signal is present, then the characteristics of the adaptive filter may possibly be degraded. When ambient conditions and background noise are considerably different for communicating stations, e.g., those of portable telephone or mobile satellite communications, depending on how these stations are used, it is considerably difficult to set the threshold value to an optimum level, and it takes a considerable period of time to search for the threshold value.

(2) In the event of a reception failure in satellite circuits, undefined data is outputted from the demodulator to the audio decoder, which tends to operate in error and generate noise. When the generated noise is applied to the subtractor, it degrades the characteristics of the adaptive filter.

SUMMARY OF THE INVENTION

It is an object of the present invention to provide a satellite communication apparatus which is capable of accurately determining whether there is a received audio signal or not without being affected by ambient conditions, for thereby preventing the characteristics of an adaptive filter from being degraded.

In the arrangement of the present invention, the demodulator emodulates a signal received by the antenna, generating synchronizing frame data and a synchronizing frame signal. At this time, the demodulator also generates a synchronization status signal indicating whether the synchronizing frame signal is being generated at a constant period or not. The echo canceler determines whether there is an audio signal or not based on the synchronization status signal which has been generated by the demodulator and delayed for a given period of time by the delay circuit. Based on the determined result, the echo canceler estimates tap coefficients for generating the quasi-echo signal, and updates the quasi-echo signal.

Since a received audio signal is detected on the basis of a frame synchronization status of satellite circuits, the audio signal can be detected with accuracy.

The above and other objects, features, and advantages of the present invention will become apparent from the following description with references to the accompanying drawings which illustrate an example of the present invention.

DETAILED DESCRIPTION OF THE PREFERRED EMBODIMENT

Figure 1:
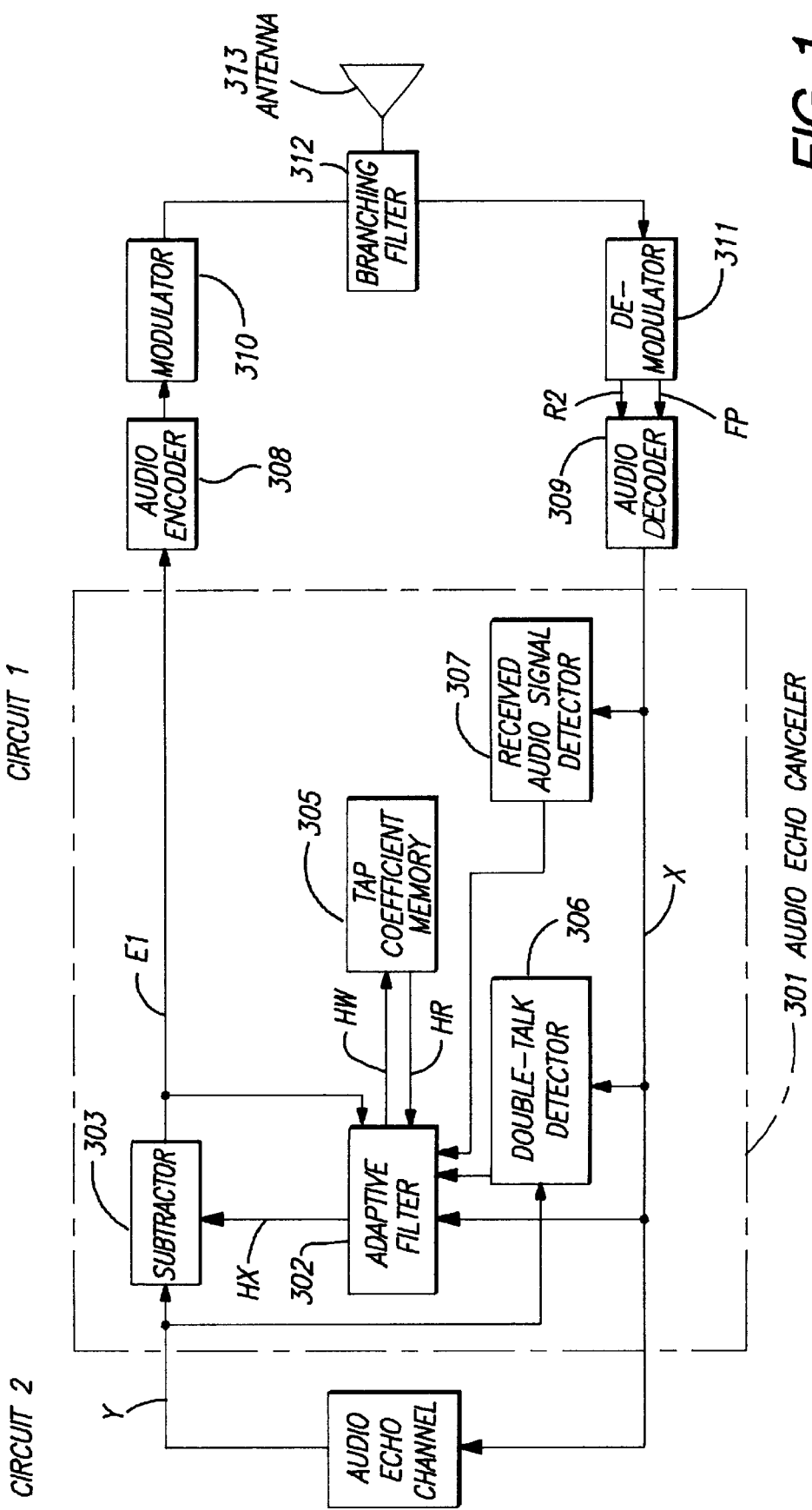
FIG. 1 is a block diagram of a conventional satellite communication apparatus with an echo canceler.
Figure 2:
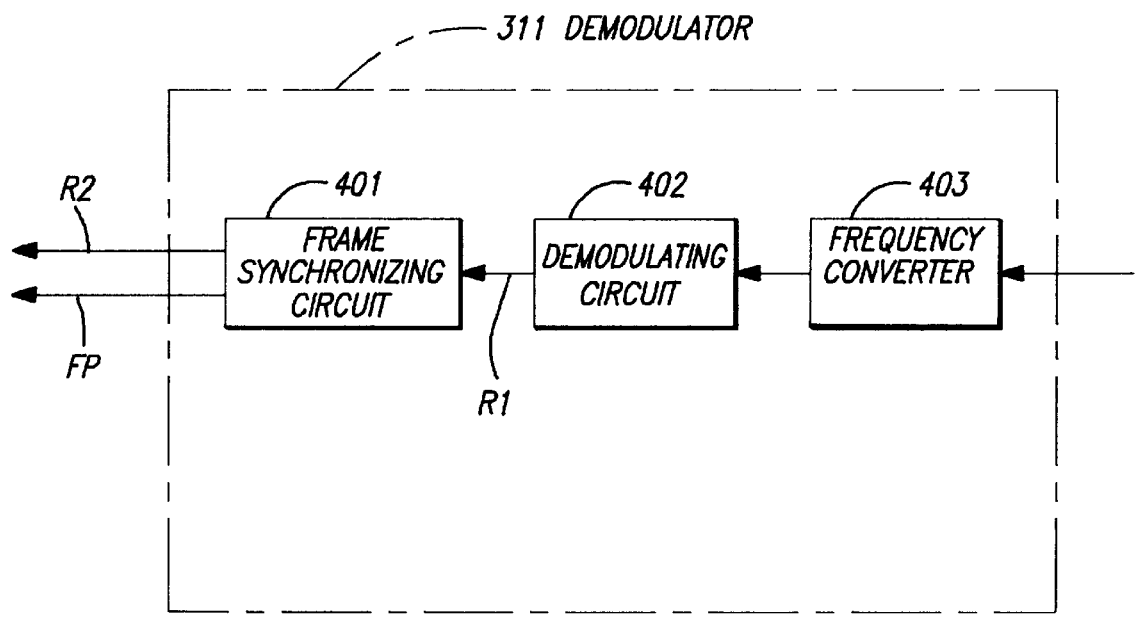
FIG. 2 is a block diagram of a demodulator of the conventional satellite communication apparatus shown in FIG. 1.
Figure 3:
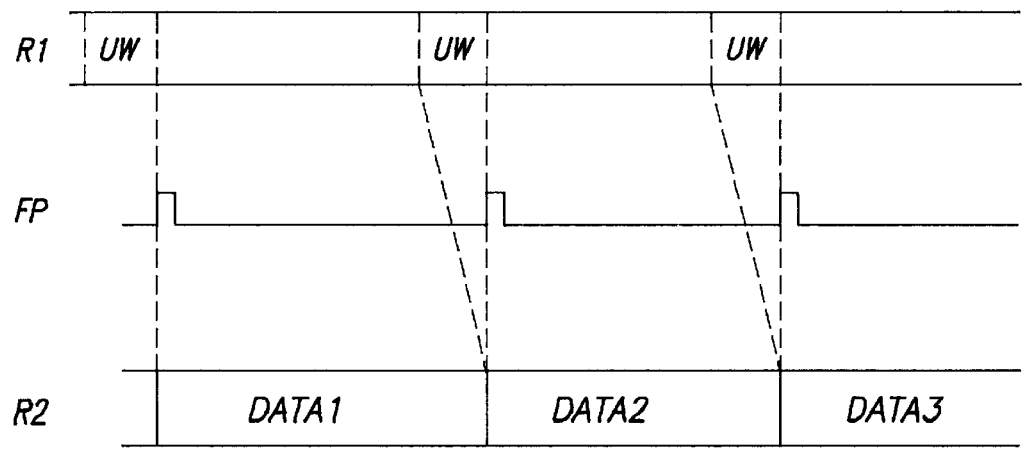
FIG. 3 is a timing chart of a digital baseband signal, a synchronizing frame signal, and synchronizing frame data which are generated by the demodulator shown in FIG. 2.
Figure 4:
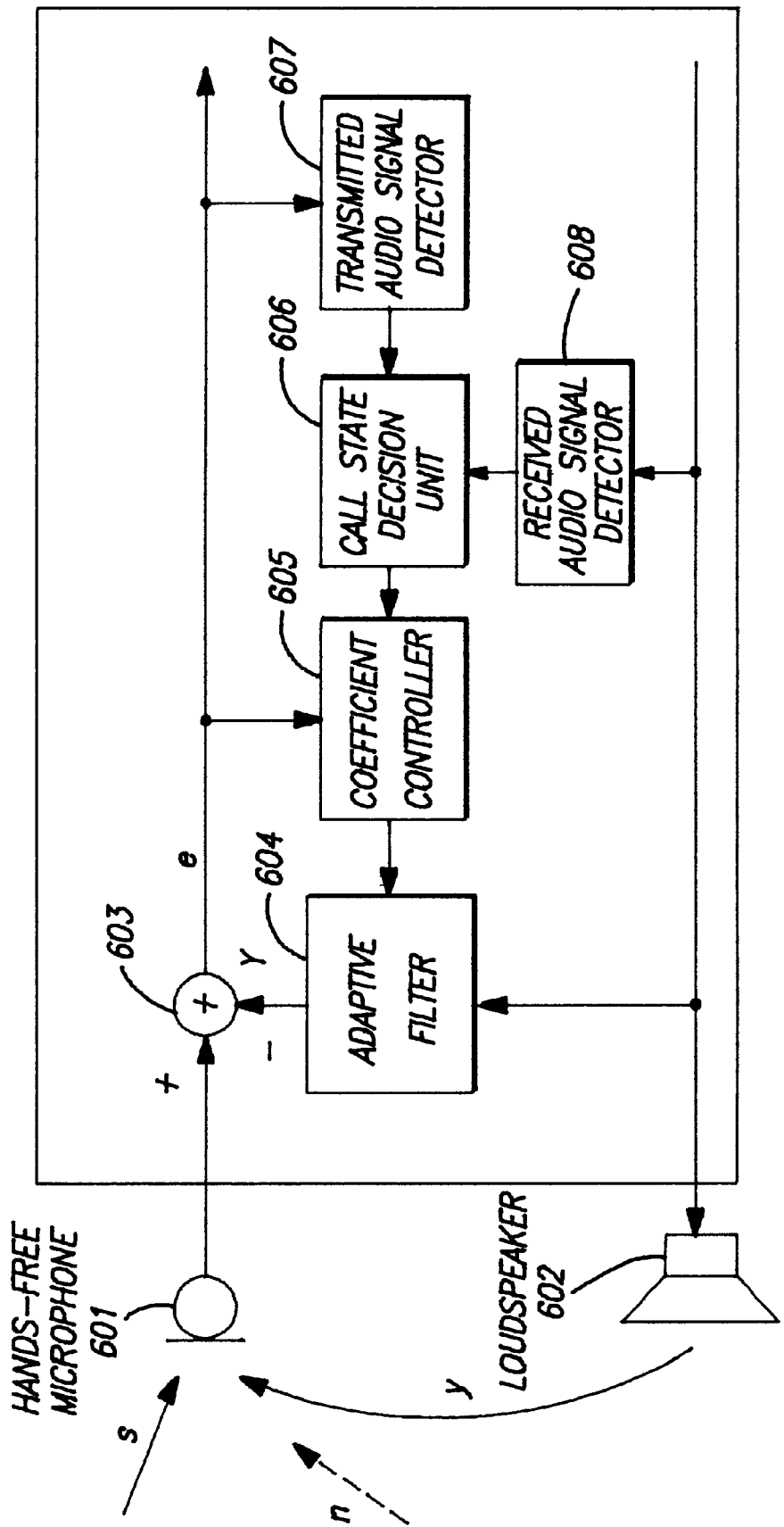
FIG. 4 is a block diagram of another conventional satellite communication apparatus.
Figure 5:
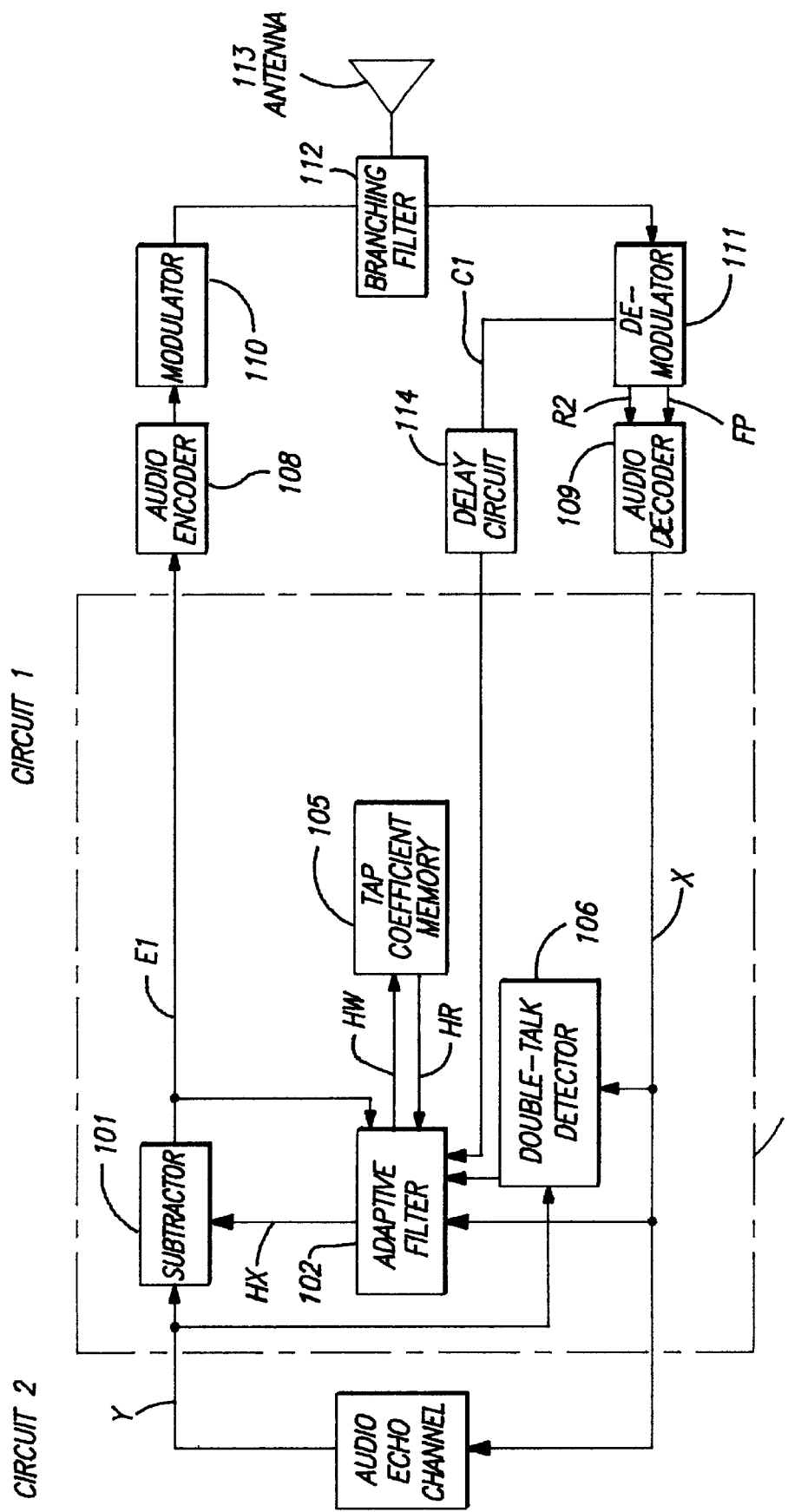
FIG. 5 is a block diagram of a satellite communication apparatus according to the present invention.
Figure 6:
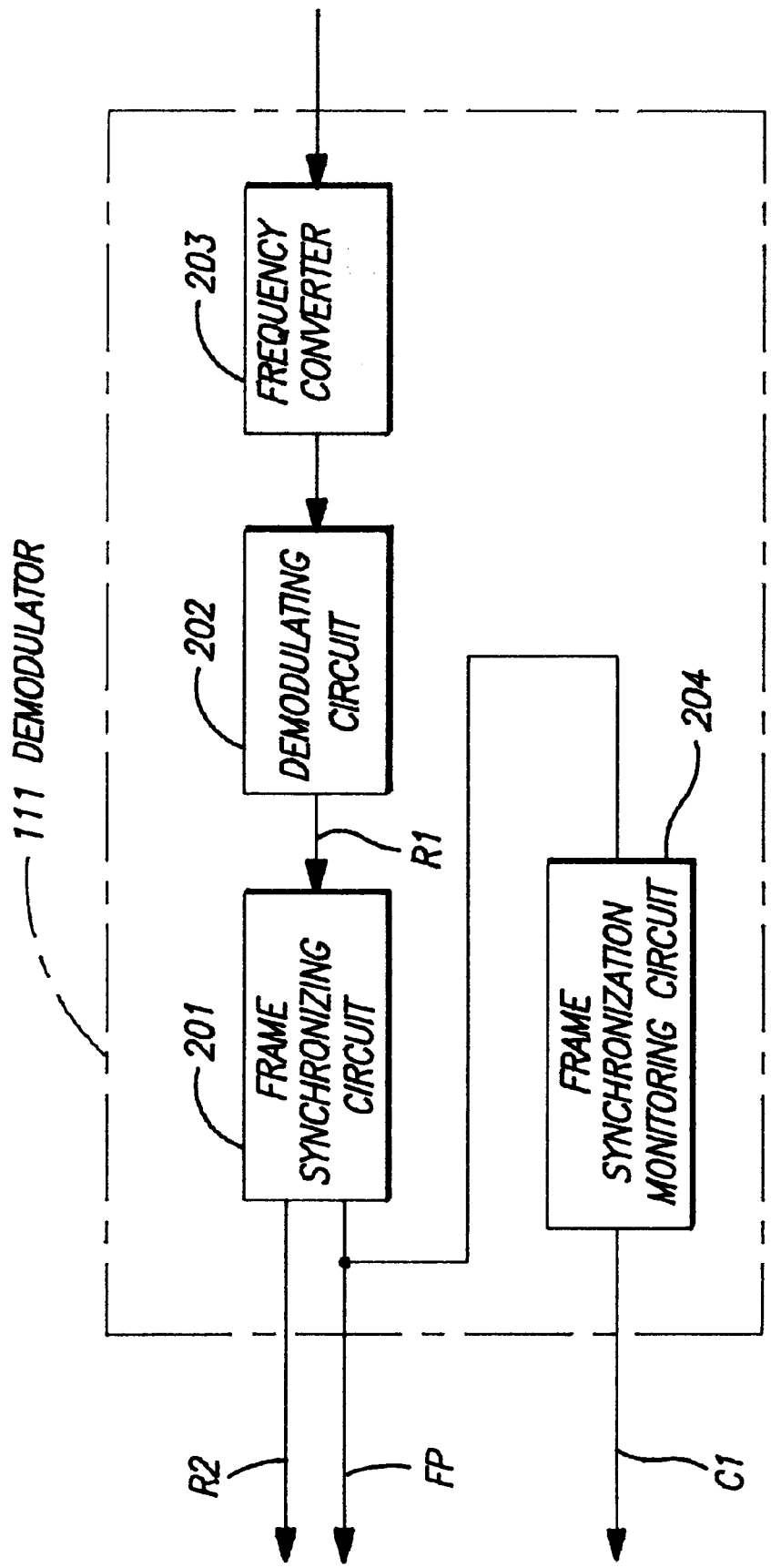
FIG. 6 is a block diagram of a demodulator of the satellite communication apparatus shown in FIG. 5.

As shown in FIGS. 5 and 6, a satellite communication apparatus according to the present invention differs from the conventional satellite communication apparatus shown in FIG. 1 in that it has a different demodulator 111 and also additionally includes a delay circuit 114. As shown in FIG. 6, the demodulator 111 differs from the demodulator 311 shown in FIG. 2 in that it additionally has a frame synchronization monitoring circuit 204.

Operation of the satellite communication apparatus according to the present invention, which differs when there is a received audio signal and there is no received audio signal, will be described below. Details of other operation are identical to those described above with respect to the conventional satellite communication apparatus and will not be described in detail below.

When signals are being received well in satellite circuits or signals containing effective audio data are being received by a terminal station, since frame synchronization is established, a frame synchronizing circuit 201 generates a synchronizing frame signal FP and synchronizing frame data R2 based on a digital baseband signal R1 outputted from a demodulator 202, and outputs the synchronizing frame signal FP and the synchronizing frame data R2 to an audio decoder 109.

At the same time, the synchronizing frame signal FP from the frame synchronizing circuit 201 is outputted at a constant period to the frame synchronization monitoring circuit 204, which holds a synchronization status signal C1 at a "0" level and outputs the synchronization status signal C1 to the delay circuit 114.

The delay circuit 114 delays the supplied synchronization status signal C1 for a known processing time of the audio decoder 109, generates a synchronization status signal C2 having the same polarity as the synchronization status signal C1, and outputs the synchronization status signal C2 to an adaptive filter 102.

Since the delay circuit 114 delays the synchronization status signal C1, the time at which a digital audio signal X is inputted to the adaptive filter 102 and the time at which the synchronization status signal is inputted when the digital audio signal X is received by the satellite circuit are the same as each other.

A process of estimating tap coefficients with the adaptive filter 102, a process of generating a quasi-echo signal HX, and a process of stopping the estimation of tap coefficients when a double-talk condition occurs are the same as those which are carried out by the conventional satellite communication apparatus.

However, the adaptive filter 102 is supplied with the synchronization status signal C2 before tap coefficients are to be estimated. If the synchronization status signal C2 is of a "0" level, then the adaptive filter 102 estimates tap coefficients. If the synchronization status signal C2 is of a "1" level, then the adaptive filter 102 does not estimate tap coefficients. Because the synchronization status signal C2 is of a "0" level in the illustrated embodiment, the adaptive filter 102 estimates tap coefficients according to the equation (2) described above, and generates a new quasi-echo signal HX according to the equation (1) using the estimated tap coefficients and the digital audio signal X.

When signals are being received poorly in satellite circuits or there is no significant audio signal in the other station with no signal transmission effected, since no frame synchronization is established in the demodulator 111, the synchronizing frame signal FP outputted from frame synchronizing circuit 201 is set to a "0" level at all times, and the synchronizing frame data R2 also outputted therefrom is undefined data. Because the frame synchronization monitoring circuit 204 does not receive the synchronizing frame signal FP within a certain fixed time, the frame synchronization monitoring circuit 204 sets the synchronization status signal C1 at a "1" level. The delay circuit 114 delays the synchronization status signal C1, producing the synchronization status signal C2, which is supplied to the adaptive filter 102.

Since the synchronization status signal C2 is of a "1" level, the adaptive filter 102 stops estimating tap coefficients until the synchronization status signal C2 becomes a "0" level. At this time, the quasi-echo signal HX is not updated as the adaptive filter 102 stops estimating tap coefficients.

While a preferred embodiment of the present invention has been described using specific terms, such description is for illustrative purposes only, and it is to be understood that changes and variations may be made without departing from the spirit or scope of the following claims.

What is claimed is:

1. A satellite communication apparatus comprising:
   an echo canceler for generating a quasi-echo signal based on internally generated tap coefficients and suppressing an echo generated in an audio signal to be transmitted using the generated quasi-echo signal;
   an audio encoder for encoding an audio signal outputted from said echo canceler into an encoded audio signal in a predetermined format;
   a modulator for modulating the encoded audio signal from said audio encoder according to a predetermined modulation process and converting the modulated audio signal into an audio signal having a predetermined radio frequency;
   an antenna for outputting the audio signal from said modulator and receiving an audio signal transmitted from an external source;
   a demodulator for demodulating the audio signal received by said antenna and generating and outputting synchronizing frame data and a synchronizing frame signal and generating a synchronizing status signal indicative of whether said synchronizing frame signal is generated at a constant period or not;

an audio decoder for decoding the synchronizing frame data and the synchronizing frame signal outputted from said demodulator to generate a digital audio signal, and outputting the digital audio signal to said echo canceler;

a branching filter for outputting the audio signal from said modulator to said antenna and outputting the audio signal received by said antenna to said demodulator; and a delay circuit for delaying said synchronizing status signal for a predetermined period of time, and outputting the delayed synchronizing status signal to said echo canceler;

said echo canceler estimating said tap coefficients based on said delayed synchronizing status signal from said delay circuit.

2. A satellite communication apparatus according to claim 1, wherein said echo canceler comprises:

a tap coefficient memory for generating and outputting said tap coefficients;

a double-talk detector for detecting whether the digital audio signal outputted from said audio decoder and an audio signal generated in another transmission circuit are simultaneously present or not;

an adaptive filter for generating and outputting said quasi-echo signal based on said tap coefficients, and estimating tap coefficients for said tap coefficient memory based on the synchronizing status signal outputted from said delay circuit and a detected result from said double-talk detector; and a subtractor for subtracting said quasi-echo signal from said audio signal and outputting the difference as the audio signal to be transmitted.

3. A satellite communication apparatus according to claim 1, wherein said demodulator comprises:

a frequency converter for converting the frequency of the audio signal received by said antenna;

a demodulating circuit for demodulating the audio signal whose frequency has been converted by said frequency converter and outputting the demodulated audio signal;

a frame synchronizing circuit for detecting a pattern indicative of the first timing of effective data from the demodulated audio signal, and generating and outputting said synchronizing frame data and said synchronizing frame signal based on said detected pattern; and a frame synchronization monitoring circuit for generating a synchronization status signal indicating whether said synchronizing frame signal is being outputted at a constant period from said frame synchronizing circuit or not, and outputting said synchronization status signal to said adaptive filter.

4. A satellite communication apparatus according to claim 2, wherein said demodulator comprises:

a frequency converter for converting the frequency of the audio signal received by said antenna;

a demodulating circuit for demodulating the audio signal whose frequency has been converted by said frequency converter and outputting the demodulated audio signal;

a frame synchronizing circuit for detecting a pattern indicative of the first timing of effective data from the demodulated audio signal, and generating and outputting said synchronizing frame data and said synchronizing frame signal based on said detected pattern; and a frame synchronization monitoring circuit for generating a synchronization status signal indicating whether said synchronizing frame signal is being outputted at a constant period from said frame synchronizing circuit or not, and outputting said synchronization status signal to said adaptive filter.

* * * * *